Patented Oct. 18, 1927.

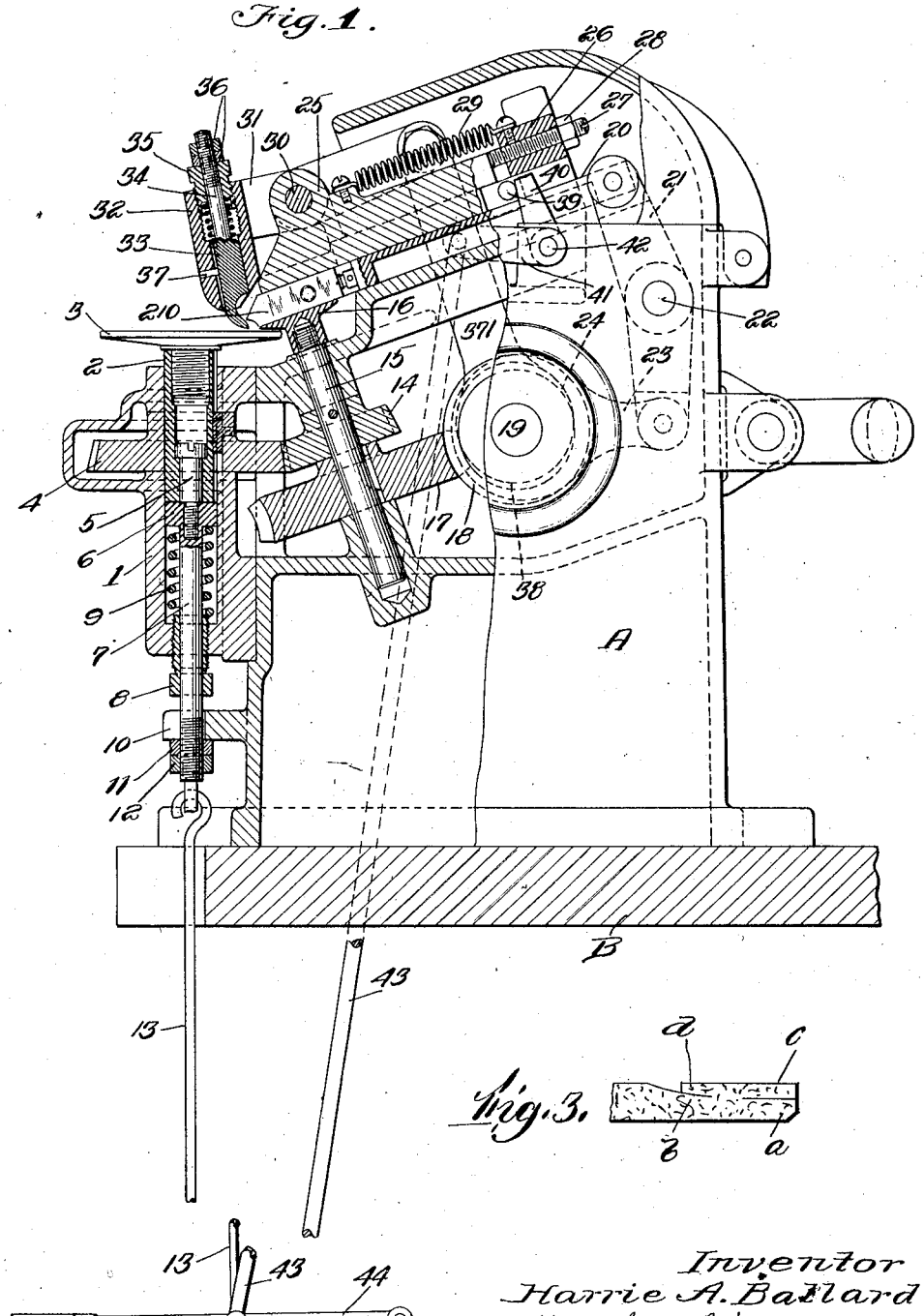

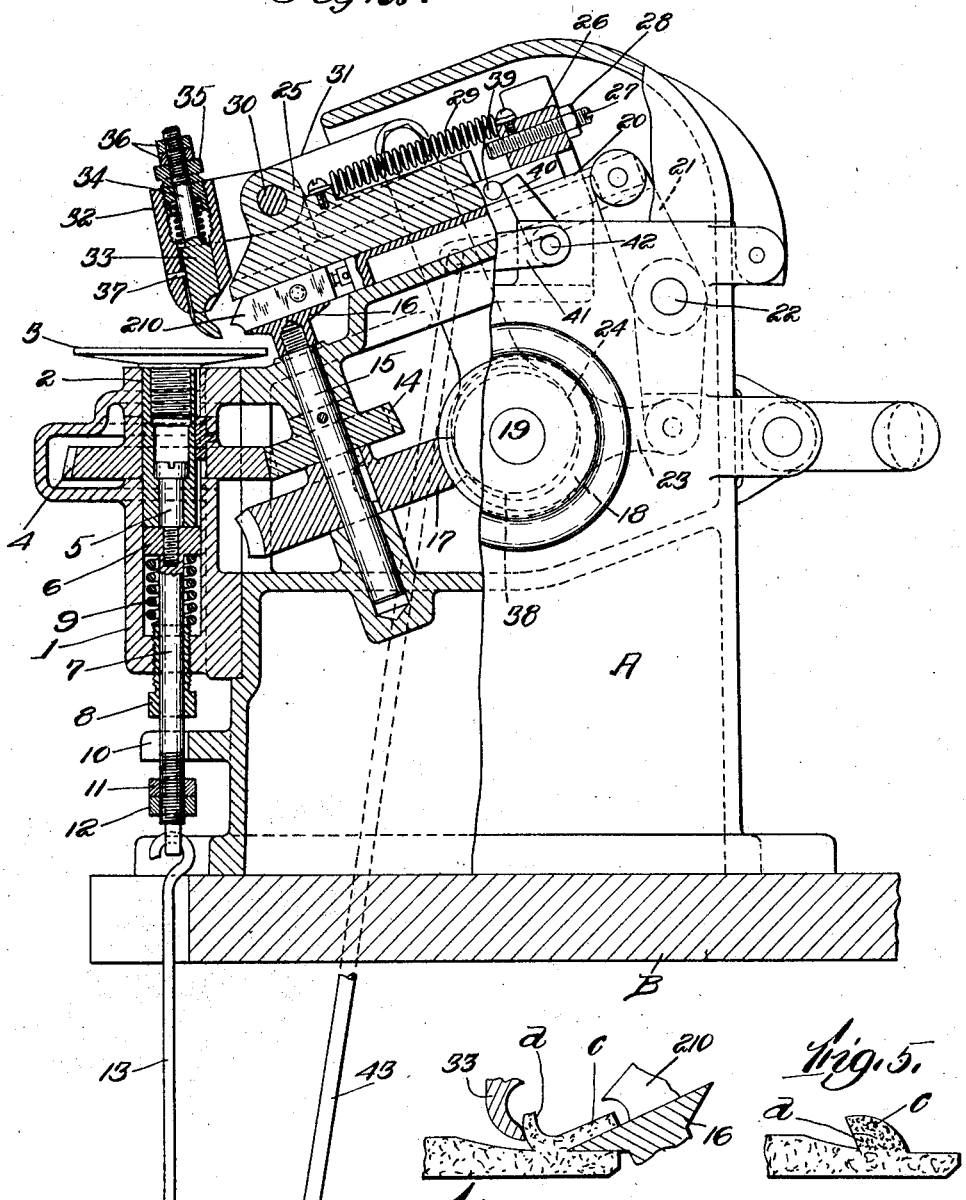

1,645,515

UNITED STATES PATENT OFFICE.

HARRIE A. BALLARD, OF BOSTON, MASSACHUSETTS, ASSIGNOR TO GENERAL SHOE MACHINERY COMPANY, OF BOSTON, MASSACHUSETTS, A CORPORATION OF MAINE.

INNERSOLE-FORMING MACHINE.

Application filed March 17, 1921. Serial No. 452,947.

This invention relates to machines for forming a stitching rib on the inner sole of a welt shoe, the machine comprising in general a work support and feed member for feeding the work thereover and a pair of forming tools engaging on opposite sides of a pair of oppositely facing channel lips which are compacted into the desired contour thereby to form the rib.

In order to permit the ready insertion and removal of work, this invention contemplates the use of a depressible work support, and in conjunction therewith provision by which the forming tool engaging the inner side of the rib may be moved inwardly out of operative relation thereto simultaneously with the depression of the support.

For a more complete understanding of this invention together with other objects and advantageous details and combinations of parts, reference may be had to the accompanying drawings illustrating an embodiment thereof, and in which Figure 1 is a side elevation with parts in section of a rib-forming machine constructed according to this invention, the parts being in position to operate on a shoe sole.

Figure 2 is a similar view, but showing the work table depressed and the inner rib-forming tool retracted.

Figure 3 is a fragmentary section through the marginal portion of an inner sole as prepared preliminary to the rib-forming operation.

Figure 4 is a similar section showing the relative positions of the rib-forming members during the operation of the machine.

Figure 5 is a similar section showing the rib as formed.

Referring to the drawings, A represents a machine head carrying the operative machine parts and mounted on a bench or other support B. At 1 is shown a forwardly projecting bracket, within which is mounted for rotation and axially sliding motion a hollow vertical shaft 2, which carries at its upper end a work support or table 3 having a shank threaded into the shaft 2. Keyed to the shaft 2, but held from axial movement therewith, is a driving gear 4. A screw 5 is journaled at its upper portion within the lower end of shaft 2 and is threaded at its lower end into the enlarged upper end or head 6 of a plunger rod 7 which projects through a bushing 8 threaded through the base of the bracket 1. A coil spring 9 surrounds the rod 6, and bearing between the portion 6 and the base of the bracket normally retains the work support elevated. Rod 7 passes through a lug 10 fixed to the head A and carries threaded on its lower end a stop nut 11 held in position by a check nut 12. Below these nuts, rod 7 has an eye for the reception of the hooked upper end of the rod 13. Preferably, the head 6 is slidably keyed within the bracket 1 to prevent rotation therein.

The gear 4 above-mentioned meshes with a gear 14 fixed to an inclined shaft 15. At its upper end shaft 15 has fixed thereto a feed wheel 16 which continuously engages the feather of an innersole supported on the table 3, and below the gear 14 carries a worm gear 17. Gear 17 meshes with and is actuated by a worm 18 fixed to an actuating shaft 19. Above feed wheel 16 is a forwardly and downwardly inclined slideway, in which is carried a slide 20, having fixed thereto at its forward end a forming hammer or die 210, which projects toward the upper surface of the work table as shown. At its rear end slide 20 is operatively connected to the upper end of a bent lever 21 fulcrumed at 22 to the machine head and pivoted at its lower end to an eccentric strap 23 actuated by an eccentric 24 fixed to the shaft 19.

Above the slide 20 is a second slideway parallel thereto and carrying a slide 25. At 26 is shown a fixed part of the head A having threaded therein a screw 27, the forward end of which projects within the path of slide 25 and forms an adjustable stop for the rear end thereof. A check nut 28 retains the stop in adjusted position. Slide 25 is normally held in engagement with the stop screw by means of a spring 29 engaging screws made fast in the slide and the portion 26. Pivoted at 30 to the slide 25 is a lever 31 carrying at its forward end a sleeve 32. Slidably mounted in the sleeve 32 is an inner die or rib-forming tool 33 having a shank 34 projecting through an adjusting nut 35 threaded in the upper end of the sleeve, this shank having at its upper end a pair of check nuts 36. A coil spring surrounds the shank 34 and bears between the lower portion of the tool and the nut 35 to hold the tool yieldingly downward as far as permitted by the check nuts 36. At 37 is shown a wear member to take the side thrust imparted to the tool 33 in operation of the machine. The rear end of lever 31 has pivoted thereto the upper end of a connecting rod 371 formed at its lower end as an eccentric strap for an eccentric 38 also fixed to the shaft 19.

Fixed to the slide 25 near its rear end is a pin 39, engageable by the upwardly extended arm 40 of a bell crank lever 41 pivoted to the head A at 42. To the other arm of lever 41 is connected the upper end of a rod 43. A treadle lever 44 is mounted within easy reach of the operator, and to this lever is connected the lower ends of the rods 13 and 43.

The operation of this machine is as follows:

Referring to Figure 3, an inner sole blank is channeled in opposite directions about the margin at *a* and *b* to form a pair of oppositely extending channel lips *c* and *d*, the inner edge of lip *d* being preferably trimmed away as shown. The operator now depresses the treadle, which, acting through the rods 13 and 43, lowers the work table and simultaneously moves slide 25 forwardly, away from the die 210, and brings the parts into the relative positions shown in Figure 2. On rotation of the shaft 19, the die 210 is reciprocated in its slideway toward and from the surface of the work support through eccentric 24 and its connections, and the tool 33 is given a resilient tamping motion toward the work support and inwardly toward the die or hammer 210 by the eccentric 38 and its connections. The inner sole, channeled as above described, is now inserted in the machine, the edge of the feed wheel 16 being positioned between the feather and the channel lip *c* and the tool 34 inwardly of the lip *d*. The operator now allows the treadle to rise under the action of springs 9 and 29, which brings the work support up to clamp the feather against the feed wheel and brings the tool 33 in position to turn up the inner lip *d*. The hammer 210 and the tool 33 now progressively compact the channel lips between them into substantially the form shown in Figure 5 and impart the final configuration to the inseam rib.

It will be noted that the lower face and edge of the inner lip are compacted into the same plane and that the outer lip is bent backwardly thereover with its edge in the same plane. This produces a rib having a downwardly and outwardly inclined inner face to form a guideway for the channel guide of the sewing machine, while insuring a substantial thickness of stock to render the rib amply strong to hold the stitching.

Having thus described an embodiment of this invention, it should be evident to those skilled in the art that various changes and modfications might be made therein without departing from its spirit or scope as defined in the appended claims.

I claim:

1. In a machine of the class described, a depressible work table, a slide arranged above and at one side of said table, a rib-forming tool pivoted to said slide and normally positioned to operate by movement about its pivot within the rib of an inner sole supported on said table, and means for simultaneously depressing said table and moving said slide to remove said tool from operative position.

2. In a machine of the class described, a depressible work support, a feed member engageable with the upper surface of the feather of an inner sole carried on said support, a reciprocable hammer adjacent said feed member and positioned to form the outer face of the rib of the inner sole, a slideway, a slide therein, an inner rib-forming tool carried by said slide, a stop at one end of said way, means normally holding said slide in contact with said stop with said tool in operative position relative to said rib, a treadle, and connections from said treadle to said work support and to said slide whereby, on depression of said treadle, said support is depressed and said tool retracted from operative relation to said rib to allow the ready insertion and removal of work.

3. In a machine of the class described, a depressible work support, a pair of slideways adjacent said support, a slide in each slideway, a rib-forming hammer fixed to one of said slides, a tamping member pivotally connected to the other of said slides and movable about its pivot toward and from the surface of said work support and said hammer, and means for simultaneously depressing said work support and moving said other slide to separate said table, hammer and tamping member from each other.

4. In a machine of the class described, a depressible work support, a pair of slideways adjacent said support, a slide in each slideway, a rib-forming hammer fixed to one of said slides, a tamping member pivotally connected to the other of said slides, means to reciprocate said first slide to impart operative movement to said hammer and to rock said tamping member about its pivot whereby to compact the rib of an inner sole placed between said hammer and member, a pin fixed to the other slide, a lever engaging said pin, a treadle, and connections from said treadle to said work support and said lever whereby said support may be depressed and said other slide moved to retract said tamping member from operative relation to said hammer by actuation of said treadle.

In testimony whereof I have affixed my signature.

HARRIE A. BALLARD.